United States Patent
Pszolla et al.

(10) Patent No.: US 12,074,317 B2
(45) Date of Patent: *Aug. 27, 2024

(54) RECHARGEABLE ELECTROCHEMICAL CELL

(71) Applicant: Innolith Technology AG, Basel (CH)

(72) Inventors: Christian Pszolla, Karlsruhe (DE); Laurent Zinck, Mothern (FR); Markus Borck, Stuttgart (DE); Claudia Wollfarth, Karlsruhe (DE); Julia Thümmel, Karlsruhe (DE); Heide Biollaz, Waldshut (DE)

(73) Assignee: Innolith Technology AG, Basel (CH)

( * ) Notice: Subject to any disclaimer, the term of this patent is extended or adjusted under 35 U.S.C. 154(b) by 408 days.

This patent is subject to a terminal disclaimer.

(21) Appl. No.: 17/120,204

(22) Filed: Dec. 13, 2020

(65) Prior Publication Data

US 2021/0104739 A1 Apr. 8, 2021

Related U.S. Application Data

(63) Continuation of application No. 15/686,417, filed on Aug. 25, 2017, now Pat. No. 10,868,301, which is a (Continued)

(30) Foreign Application Priority Data

Sep. 27, 2013 (DE) ................. 10 2013 016 560.1

(51) Int. Cl.
*H01M 10/00* (2006.01)
*H01M 4/133* (2010.01)
(Continued)

(52) U.S. Cl.
CPC .......... *H01M 4/381* (2013.01); *H01M 4/133* (2013.01); *H01M 4/136* (2013.01); *H01M 4/382* (2013.01);
(Continued)

(58) Field of Classification Search
CPC ...... H01M 4/381; H01M 4/133; H01M 4/136; H01M 4/382; H01M 4/40; H01M 4/48;
(Continued)

(56) References Cited

U.S. PATENT DOCUMENTS 6,280,883 B1 * 8/2001 Lamanna ............ H01M 10/052
429/231.1
6,423,447 B1 7/2002 Ohsaki et al.
(Continued)

FOREIGN PATENT DOCUMENTS

WO WO 2008/023348 A1 2/2008
WO WO 2008/058685 A1 5/2008
WO WO 2011/098233 A2 8/2011

OTHER PUBLICATIONS

M. Goledzinowski et al. "Cyclic voltammetric and Raman spectroscopic studies of the Li/LiAlCl4/SO2 and Li/LiGaCl4/SO2 rechargeable systems", Journal of Power Sources, vol. 54, Issue 2, 1995, pp. 356-361, ISSN 0378-7753, (Year: 1995).*
(Continued)

*Primary Examiner* — Nicholas P D'Aniello
(74) *Attorney, Agent, or Firm* — Bose McKinney & Evans LLP

(57) ABSTRACT

A rechargeable electrochemical battery cell with a housing, a positive electrode, a negative electrode and an electrolyte which contains $SO_2$ and a conducting salt of the active metal of the cell, whereby at least one of the electrodes contains a binder chosen from the group: Binder A, which consists of a polymer, which is made of monomeric structural units of a conjugated carboxylic acid or of the alkali salt, earth alkali salt or ammonium salt of this conjugated carboxylic acid or a combination thereof or binder B which consists of a polymer based on monomeric styrene structural units or butadiene structural units or a mixture of binder A and B.

20 Claims, 5 Drawing Sheets

Related U.S. Application Data continuation of application No. 14/496,517, filed on Sep. 25, 2014, now Pat. No. 9,761,872.

(51) Int. Cl.

| | | |
|---|---|---|
| *H01M 4/136* | (2010.01) | |
| *H01M 4/38* | (2006.01) | |
| *H01M 4/40* | (2006.01) | |
| *H01M 4/48* | (2010.01) | |
| *H01M 4/58* | (2010.01) | |
| *H01M 4/587* | (2010.01) | |
| *H01M 4/62* | (2006.01) | |
| *H01M 4/66* | (2006.01) | |
| *H01M 4/80* | (2006.01) | |
| *H01M 10/0525* | (2010.01) | |
| *H01M 10/0563* | (2010.01) | |
| *H01M 4/02* | (2006.01) | |
| *H01M 4/04* | (2006.01) | |
| *H01M 4/1393* | (2010.01) | |
| *H01M 4/1397* | (2010.01) | |
| *H01M 10/054* | (2010.01) | |

(52) U.S. Cl.
CPC ............... *H01M 4/40* (2013.01); *H01M 4/48* (2013.01); *H01M 4/582* (2013.01); *H01M 4/5825* (2013.01); *H01M 4/587* (2013.01); *H01M 4/621* (2013.01); *H01M 4/622* (2013.01); *H01M 4/661* (2013.01); *H01M 4/808* (2013.01); *H01M 10/0525* (2013.01); *H01M 10/0563* (2013.01); *H01M 2004/021* (2013.01); *H01M 4/0404* (2013.01); *H01M 4/0435* (2013.01); *H01M 4/1393* (2013.01); *H01M 4/1397* (2013.01); *H01M 10/054* (2013.01); *H01M 2300/002* (2013.01)

(58) Field of Classification Search
CPC .... H01M 4/582; H01M 4/5825; H01M 4/587; H01M 4/621; H01M 4/622; H01M 4/661; H01M 4/808; H01M 10/0525; H01M 10/0563; H01M 4/0404; H01M 4/0435; H01M 4/1393; H01M 4/1397; H01M 10/054; H01M 2004/021; H01M 2300/002; Y02E 60/10
See application file for complete search history.

(56) References Cited

U.S. PATENT DOCUMENTS

| | | | |
|---|---|---|---|
| 9,761,872 B2* | 9/2017 | Pszolla | H01M 4/582 |
| 10,868,301 B2* | 12/2020 | Pszolla | H01M 4/622 |
| 11,316,191 B2* | 4/2022 | Kovacs | H01M 10/0568 |
| 11,710,849 B2* | 7/2023 | Zinck | H01M 4/386 |
| | | | 429/346 |
| 11,876,170 B2* | 1/2024 | Zinck | H01M 4/505 |
| 2003/0157409 A1 | 8/2003 | Huang | |
| 2007/0003833 A1 | 1/2007 | Li et al. | |
| 2009/0061325 A1 | 3/2009 | Odani et al. | |
| 2010/0062341 A1 | 3/2010 | Hambitzer | |
| 2011/0287304 A1 | 11/2011 | Zinck et al. | |

OTHER PUBLICATIONS

English Translation of International Search Report and Written Opinion of the International Searching Agency, PCT/DE2014/000490, Apr. 20, 2015, 22 pages.

Madria et al., Ionic Liquid Electrolytes for Lithium Batteries: Synthesis, Electrochemical, and Cytotoxicity Studies, Journal of Power Sources, Feb. 9, 2013, p. 277-284, vol. 234.

Porcher et al., Design of Aqueous Processed Thick LiFePO[sub 4] Composite Electrodes for High-Energy Lithium Battery, J. Electrochemical Society, Dec. 22, 2008, p. A133-A144, vol. 156.

Foster et al., New Highly Conductive Inorganic Electrolytes, J. Electrochemical Society, Nov. 1988, p. 2682-2686, vol. 135.

\* cited by examiner

RECHARGEABLE ELECTROCHEMICAL CELL

RELATED APPLICATIONS

This application is a continuation of U.S. patent application Ser. No. 15/686,417, filed Aug. 25, 2017, which is a continuation of U.S. patent application Ser. No. 14/496,517, filed Sep. 25, 2014, which claims priority to DE 10 2013 016 560.1, filed Sep. 27, 2013, all of which are hereby incorporated herein by reference in their entireties.

BACKGROUND

The invention relates to a rechargeable lithium battery cell with a positive electrode, a negative electrode and an electrolyte that contains a conducting salt.

Rechargeable battery cells are of great importance in many technical fields. They are often used for applications in which only relatively small current levels are required, such as mobile phones, power tools and other mobile applications. There is also a great demand for battery cells for high current applications (high-current cells), where the electric propulsion of vehicles, the application as local energy storage or the application as mass storage for grid stabilization (grid storage/grid tie application/smart grid) are of particular importance.

Development aims of rechargeable battery cells are particularly a high energy density (electrical energy per unit weight and volume), high extractable currents (low internal resistance), long service life, in particular a large number of useful charging and discharging cycles, very good operational safety and costs kept to a minimum.

Rechargeable lithium cells are in practice almost exclusively lithium-ion cells. Their negative electrode consists of copper-coated carbon, in which lithium-ions are stored during charging. The positive electrode also consists of an insertion material that is suitable for absorbing ions of the active metal. Normally the positive electrode is based on lithium-cobalt oxide which is coated onto an aluminum conducting element. Both electrodes are very thin (thickness typically less than 100 m). In order to stabilize the electrodes in a mechanical way, binder is used in addition to the active material. During charging, the ions of the active metal are discharged from the positive electrode and inserted into the negative electrode. During discharging the reverse process occurs. The ions are transported between the electrodes by means of the electrolyte, which has the required ion mobility. Lithium-ion cells contain an electrolyte consisting of a lithium salt (e.g., $LiPF_6$) dissolved in an organic solvent or a solvent mixture (e.g., based on ethylene carbonate). They are also designated hereafter as "organic lithium-ion cells."

Organic lithium-ion cells are problematic with regard to safety. Safety risks are caused in particular by the organic electrolyte. If a lithium-ion cell catches fire or even explodes, the organic solvent of the electrolyte forms the combustible material. In order to avoid such hazards, additional measures must be taken, in particular with regard to a very precise regulation of the charging and discharging processes and with regard to additional safety measures in the battery design. For example, the cell contains components that melt in the event of a fault and therefore prevent the flow of current in the cell. However, these measures lead to increased costs and increased volume and weight, thus reducing the energy density. Furthermore these methods are not always sufficiently and safety risks with above described effects can occur.

The problems are particularly serious when battery cells are to be developed for mass storage applications, as required for newly developing markets. The requirements on the stability and long-term operational safety are particularly high.

There is a high demand for improved rechargeable battery cells, which in particular meet the following requirements:

Very good electrical performance figures, in particular high energy density combined with high current draw values (power density).

Safety, even under the more challenging operating conditions in a vehicle, the application as local energy storage or the application as mass storage for grid stabilization (grid storage/grid tie application/smart grid).

Long service life, in particular a high number of usable charge and discharge cycles.

Use of cost-effective materials.

Cost-effective and maximally simple production methods.

Further important practical requirements, such as overload capability and deep discharge capability.

In WO 2011/098233 A2, a battery cell is described that satisfies these partially conflicting demands in a substantially better manner than has been the case up to now. It is characterized by the following special features, which are also preferably implemented in the battery cell of the present invention:

a) The electrolyte contains $SO_2$. Preferably this is a $SO_2$ based electrolyte. This is the term used in the context of the invention to designate an electrolyte which contains $SO_2$ not merely as an additive at a low concentration, but in which the concentration of the $SO_2$ is so high that the mobility of the ions in the conducting salt, which is contained in the electrolyte and causes the charge transport, is at least in part guaranteed by the $SO_2$. The electrolyte is preferably substantially free of organic materials, where "substantially" is to be understood in the sense that the quantity of any organic materials that may be present is so low that they do not present a safety hazard.

b) The positive electrode contains an active material having the composition $Li_xM'_yM''_z(XO_4)_aF_b$, wherein M' is at least one metal selected from the group consisting of the elements Ti, V, Cr, Mn, Fe, Co, Ni, Cu and Zn, M" is at least one metal selected from the group consisting of the metals of groups 2, 3, 4, 5, 6, 8, 9, 10, 11, 12, 13, 14, 15 and 16 of the periodic table, X is selected from the group consisting of the elements P, Si and S, x is greater than 0, y is greater than 0, z is greater than or equal to 0, a is greater than 0 and b is greater than or equal to 0.

The element X here is preferably P. Particularly preferably M' is the metal Fe and particularly preferably b is equal to 0. Lithium-iron phosphates are particularly preferred active materials of the positive electrode, for example active materials as $LiFePO_4$, $Li_xFe_yM_zPO_4$, $Li_xFe_y(SO_4)_a$ or $LiFeSO_4F$, where the suffixes x, y, z and a have the above interpretation.

The active material may contain an additional doping, which is not a component part of its atomic structure.

On the basis of this prior art the invention aims to create a cell with improved functioning and operational safety.

This technical problem is solved by a rechargeable electrochemical battery cell comprising a housing, a positive electrode, a negative electrode and an electrolyte that contains $SO_2$ and a conducting salt of the active metal of the cell, wherein at least one electrode contains a binder selected from the group consisting of binder A, consists of a polymer, build up from monomeric structural units of a conjugated carboxylic acid or from the alkali salt, alkaline earth salt or ammonium salt of the conjugated carboxylic acid, or from a combination of the above or binder B consists of a polymer, based on monomeric styrene or butadiene structural units or a mixture of binder A and binder B Examples for binder A are lithium polyacrylate (Li-PAA) or polyacrylic acid.

Examples for binder B, which is based on monomeric styrene structural units and butadiene structural units, are the products TRD102A and TRD2001 by JSR Micro.

A mixture of binder A and B is considered to be a mixture of the described polymers or a mixture of the monomeric structural units of the respective binder.

For instance, a polymer consisting of the monomeric structural units of styrene, butadiene and acrylic acid is a mixture of the individual monomeric structural units.

By combining the features according to the invention a substantial improvement of the function of the cells is achieved. In particular it was found within the context of the invention that the amount of lithium ions which are irreversibly used for the solid electrolyte interface formation on the negative electrode during the first charge cycle is substantially reduced. Consequently the battery cell has more cycleable capacity left for subsequent cycles.

The cycle life of the cell is extended by the increased initial capacity. In addition, the mechanical and chemical stability of the negative and the positive electrode is improved by the use of binder A or B or a mixture of A and B. This leads to an extended cycle life of the battery cell, too.

The production process of the electrodes and their processing in the further process of the production of cells are substantially simplified. As binder A and binder B are water soluble or dispersible in water all production steps can be taken without the use of toxic, polluting and highly flammable organic solvents. There is no need for special safety measures (such as ventilation, sensor monitoring or explosion protection), enclosed production devices or elaborate solvent recovery.

The electrodes consist each of an active material, that changes the oxidation state during charging or discharging of the cell. Charging and discharging is intercalating and deintercalating ions of the active metals of the cell, especially lithium ions. Electrons released or used in this process move into an electronically conductive current collector which is part of the electrode as well.

As already mentioned, the present invention is preferably used in a rechargeable lithium battery cell in accordance with WO 2011/098233 A2. Reference is made to the content of this document in full. For example, the present invention incorporates the following special features that are substantially described in the document cited, from which further details can also be obtained:

The positive electrode is unusually thick, minimum thicknesses of 0.25 mm, 0.3 mm, 0.4 mm, 0.5 mm, 0.6 mm, 0.8 mm and 1.0 mm being particularly preferred, in this order. Preferably, the maximum thickness of the positive electrode is 2 mm, particularly preferably a maximum of 1.5 mm.

The negative electrode preferably contains carbon as the active material for absorbing lithium ions. It is also preferably unusually thick, minimum thicknesses of 0.2 mm, 0.3 mm, 0.4 mm, 0.5 mm, 0.6 mm and 0.8 mm being particularly preferred, in this order. The thickness of the negative electrode is preferably a maximum of 1.5 mm, particularly preferably a maximum of 1 mm.

The electrodes have a conducting element with a three-dimensional porous metal structure, in particular in the form of a metal foam. It is particularly preferred if this porous metal structure extends substantially over the entire thickness of the electrode. In accordance with a further preferred embodiment the active material of the electrode is substantially uniformly distributed in the three-dimensional porous metal structure that forms the conducting element of said electrode.

The electrolyte contains a relatively high concentration of $SO_2$ in comparison to the amount of conducting salt, with minimum values of 1.5 mol $SO_2$, 2 mol $SO_2$, 2.5 mol $SO_2$, 3 mol $SO_2$, 4 mol $SO_2$, 4.5 mol $SO_2$, 5 mol $SO_2$ and 6 mol $SO_2$ per mol conducting salt being particularly preferred in this order. Preferably, the maximum concentration is 22 mol $SO_2$ per mol conducting salt.

The electrolyte contains as a conductive salt a halogenides, oxalates, borates, phosphates, arsenates and gallates of the active metal. Preferably a lithium tetrahalogenoaluminate is used and particularly preferably a lithium tetrachloroaluminate.

The solution to the problem addressed by the invention was faced with a number of difficult issues related to the use of an inorganic, preferably $SO_2$-based, electrolyte and the use of thick electrodes, with a conducting element with a three-dimensional porous metal structure, which are not present in the case of conventional cells with an organic electrolyte and thin layer electrodes.

The electrodes contain a current collector with a three dimensional porous metal structure particularly in the form of metal foam. In order to evenly distribute the active material together with the binder within the three dimensional porous metal structure, a homogenous mixture of the components together with a solvent needs to be produced. This mixture must be easy to introduce into the metal structure. If these conditions are not met, substantial problems arise in the production of a thick electrode.

Binders, such as fluorinated binders, dissolve often only in highly flammable organic solvents, which are detrimental to the environment. The production of binder-containing electrodes requires use of elaborate equipment, which takes into account the use of these solvents. Explosion prevention, environmental protection and the protection of the exposed employees are especially problematic during electrode production.

The good electric connection of the active material to the three dimensional porous metal structure must not be hindered by the binder.

The optimal content of binder is difficult to determine: A binder content in the electrodes, which is too low, leads to difficult handling of the produced electrodes, as the almost binder-free electrodes have too little adhesion to the current collector. Upon inappropriate operation and under unfavorable ambient conditions there may occur a release of particles of the active material. This can lead to uselessness of the product, soiling of the work area and putting employees at risk through uncontrolled uptake of small particles.

A binder content, which is too high, has a negative effect on the energy density of the battery cell. The weight of the binder reduces the energy density.

The electrolyte is very corrosive. The binder must be stable towards the electrolyte containing $SO_2$. Thus, the choice of suitable material is very limited.

The binder must maintain its stability over a long period of time, even if in case of malfunctioning during the charge and discharge cycles the active metal—lithium in case of a lithium cell—is deposited in its metallic state and gets into contact with the binder. If the binder reacts with the metal, a destabilization of the mechanical structure of the electrode will be the consequence. The cell becomes useless.

The formation of surface layers on the negative electrode in electrolytes containing $SO_2$ is increased by the use of binders such as fluorinated binders, especially THV (terpolymer from tetrafluorethylene, hexafluoropropylene an vinylidene fluoride) and polyvinylidenefluoride (PVDF). The cyclable capacity in the following cycles is due to this loss reduced.

Binders in the electrode often lead to a poor wettability of the surface of the electrode with an electrolyte containing $SO_2$. This leads to high impedance of the cell, leading to problems during the operating of the cell.

Because of the use of binders, the internal resistance $R_i$ increases as the electronic connection of the active material to the three dimensional metal structure is reduced, so that a compromise between the mechanical stabilization and the increase of the resistance must be found.

In the course of the invention it was found, that, despite these concerns, the use of a binder A or B or a mixture of A and B in the electrodes, and especially in the negative electrode, surprisingly is not only possibly but also especially advantageous. The advantages of the battery cell relating to the invention containing these electrodes are the increased initial capacity as well as the chemical and mechanical stabilization of the electrodes, as explained above. In addition, the production was simplified.

Further advantages are achieved in consideration of the preferred embodiment, described below.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
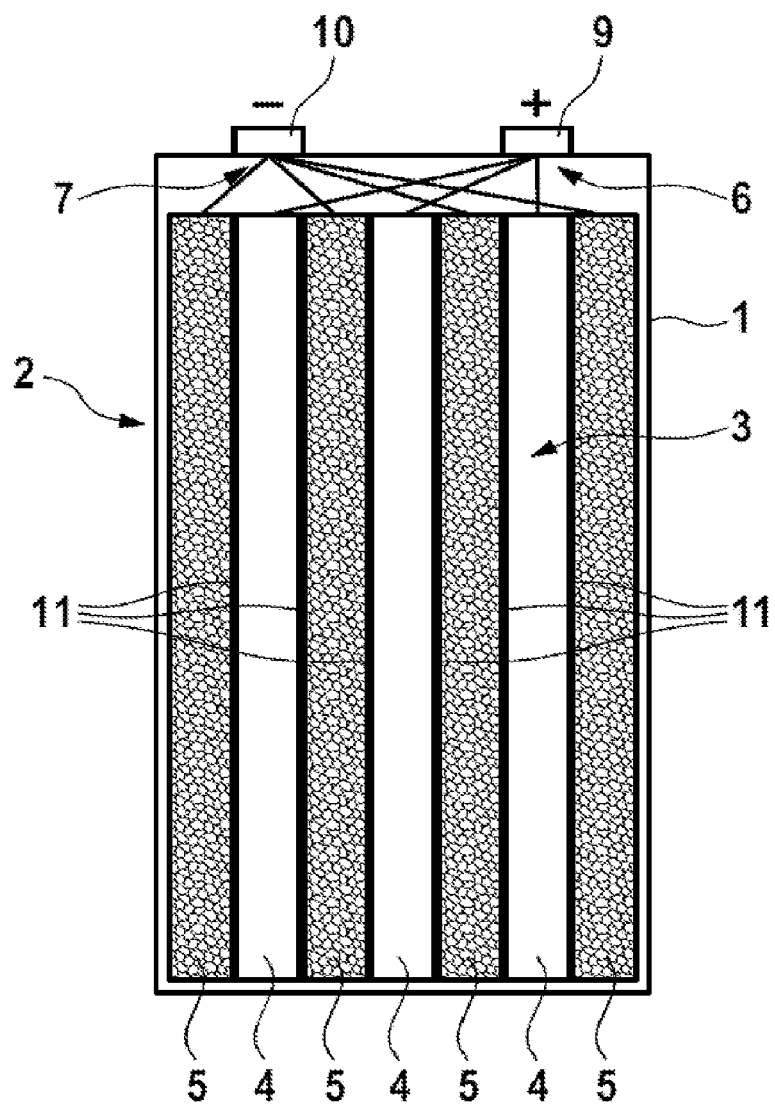
FIG. 1 a cross-section model of a battery cell according to the invention.
Figure 2:
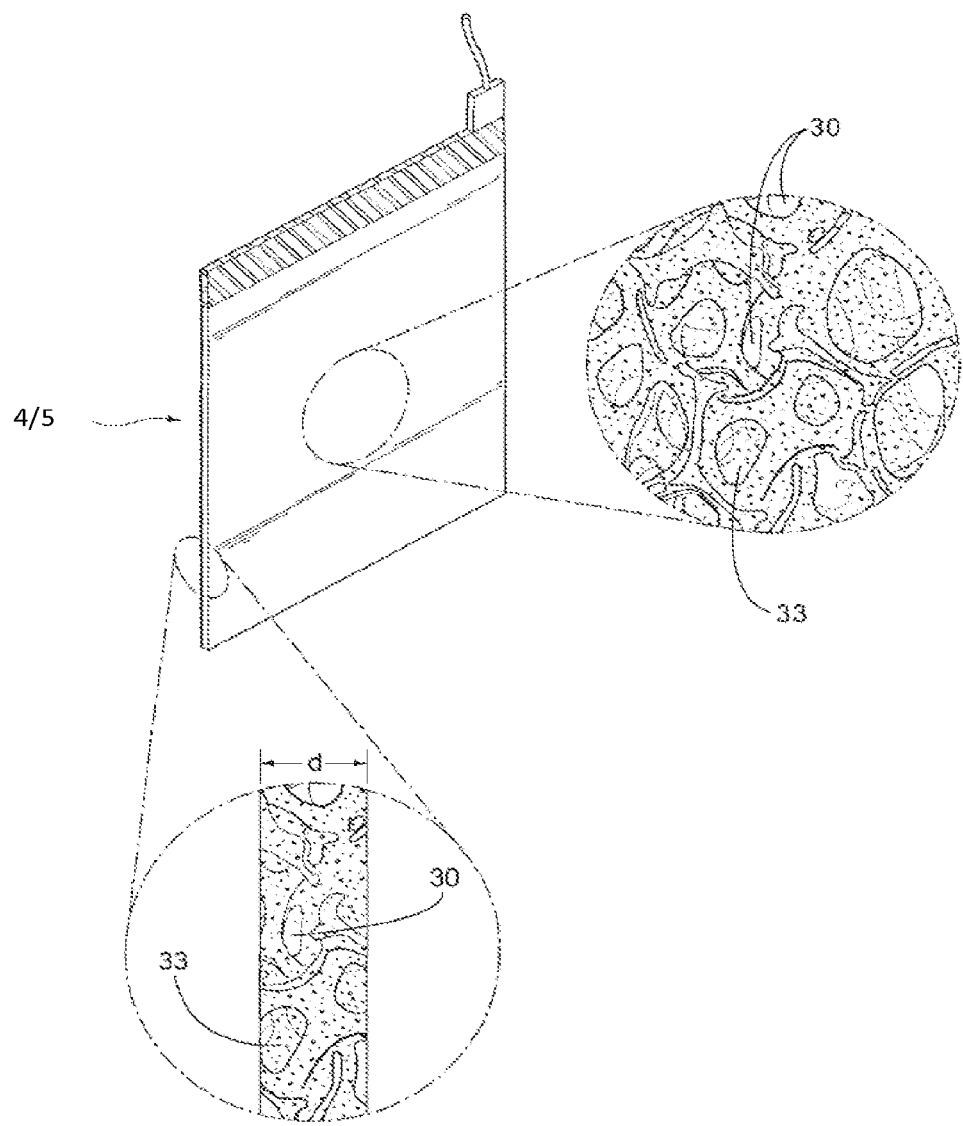
FIG. 2 Drawing in perspective of an electrode with schematically enlarged image details for the explanation of their inner structure.

The housing 1 of the rechargeable battery cell 2 shown in FIG. 1 encloses an electrode arrangement 3 comprising a plurality (three in the case shown) of positive electrodes 4 and a plurality (four in the case shown) of negative electrodes 5. The electrodes 4, 5 are connected in the usual manner with corresponding terminal contacts 9, 10 of the battery by means of electrode leads 6, 7. The cell is filled with an $SO_2$-based electrolyte, not shown in the figures, in such a manner that the electrolyte preferably penetrates completely into all pores, particularly inside the electrodes 4, 5.

As is common, the electrodes 4, 5 have a planar shape, i.e., they are shaped as layers having a thickness which is small relative to their extension in the other two dimensions. They are separated from each other by separators 11. The housing 1 of the prismatic cell shown is essentially cuboid, the electrodes and the walls shown in cross-section in FIG. 1 extending perpendicularly to the drawing plane and being essentially straight and flat. However, the cell according to the invention can also be designed as a spirally wound cell.

The electrodes 4, 5 comprise in usual manner a current collector element, which is made of metal and serves to provide the required electronically conductive connection of the active material of the respective electrode. The current collector element is in contact with the active material involved in the electrode reaction of the respective electrode. Preferably, the current collector element of the positive electrode, most preferably also the current collector element of the negative electrode, is provided in the form of a three-dimensional porous metal structure, particularly in the form of a metal foam. The term "three-dimensional porous metal structure" designates in this context every structure made of metal that does not just extend like a thin sheet only over the length and width of the planar electrode, but also extends over its thickness dimension, and which is porous in such a manner that the active material of the electrode can be incorporated into the pores.

Figure 4:
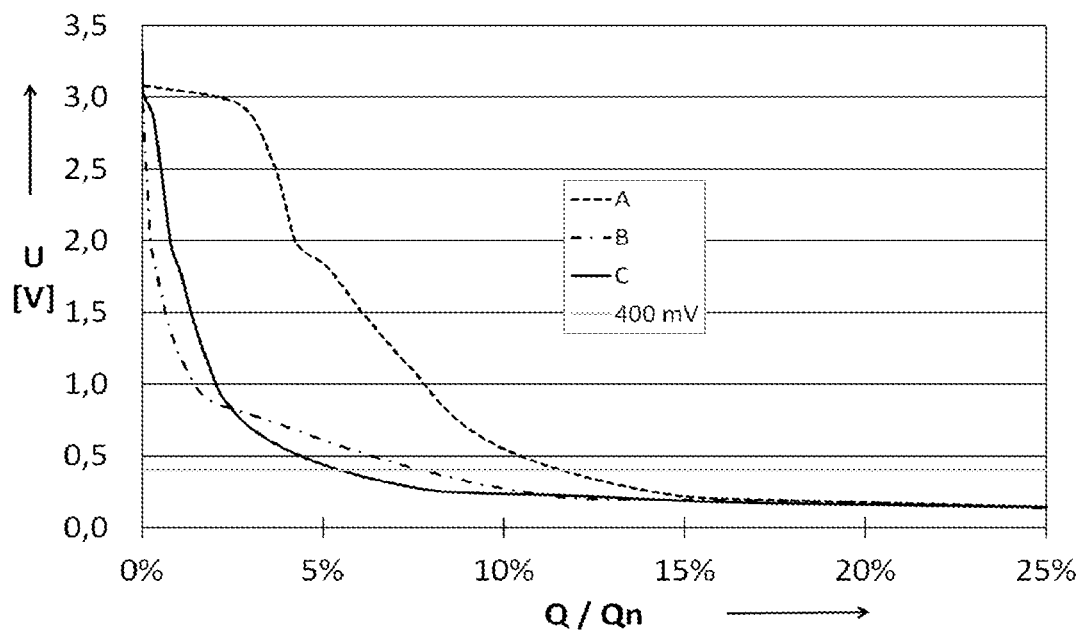
FIG. 4 the graph of the electric potential over the charge capacity for three different negative electrodes.

FIG. 4 shows, by means of two schematic enlarged excerpts, the internal structure of a preferred positive electrode. It has a conducting element 30 with a three-dimensional porous metal structure. The conducting element is preferably formed by a metal foam, wherein it is particularly advantageous if the porous metal structure extends substantially over the entire thickness d of the positive electrode. The active material 33 of the electrode, for example for a positive electrode lithium-iron phosphate, is located in the pores of the porous metal structure and is preferably distributed homogeneously therein. Further details can be obtained from the above-mentioned document WO 2011/098233 A2. In the context of the invention particularly advantageous results have been found to be obtained with the combination of the electrode types described there and a binder A or B or a mixture of A and B as described here.

During manufacture of the electrode, the active material and binder A or B or a mixture of A and B are incorporated into the porous structure of the current collector element such that it fills the pores of the current collector element uniformly over the whole thickness of the metal structure. The material is then pressed under high pressure, the thickness after the pressing operation being preferably no more than 80%, particularly preferably no more than 60% and more particularly preferably no more than 40% of the initial thickness.

The three-dimensional porous metal structure 30 of the current collector element extends essentially over the whole thickness d of the current collector element and the active material and binder A or B or a mixture of A and B are distributed essentially homogeneously therein. With respect to the two stated conditions, "essentially" is to be construed such that the cell function is only slightly impaired by any deviations. In any case, the porous metal structure should extend over at least 70%, preferably at least approximately 80%, of the thickness of the electrode.

A preferred embodiment of the battery cell according to the invention has positive and negative electrodes of which at least either the positive or the negative electrodes contain only binder A.

Another preferred embodiment of the battery cell according to the invention has positive and negative electrodes of which at least either the positive or the negative electrodes contain only binder B.

Another preferred embodiment of the battery cell according to the invention has positive and negative electrodes of which at least either the positive or the negative electrodes contain a mixture of binder A and binder B.

Another preferred embodiment of the battery cell according to the invention has positive and negative electrodes of which at least either the positive or the negative electrodes contain a binder chosen from the group:
  Binder A which consists of a polymer which is made of monomeric structural units of a conjugated carboxylic acid or of the alkali salt or earth alkali salt or ammonium salt of this conjugated carboxylic acid or of a combination of these
  or binder B which consists of a polymer based on monomeric styrene structural units or butadiene structural units
  or a mixture of binder A and binder B
  and which in addition contain another binder which is different from binder A and binder B.

The electrodes described in WO 2011/098233 A2 are remarkably thick. Due to the thickness and, in addition due to the pore structure of the used porous metal structure of the current collector, there were additional problems expected in combination with a binder A or binder B or a mixture of A and B.

In order to receive a high percentage of solid material in the electrode, the paste used in production must have optimal characteristics, the paste is made of active material, binder, possibly further components and solvent. Only then the pores of the current collector consisting of a porous metallic structure can be filled almost completely with solid material and so an electrode with high capacity can be manufactured.

The mechanical and chemical stability of the negative and the positive electrode are important criteria for the quality of a rechargeable battery cell. This stability can be obtained by the use of a binder in the electrodes. A binder must meet the following requirements for an electrode:
  Simple processibility upon production of the electrode: homogeneous mixing with the other parts of the electrode such as the active material to obtain an electrode with sufficient loading.
  Good solubility or dispersibility in the solvent, which should be water, because of its easy handling.
  Suitable melting range to avoid both melting away (e.g., stability during thermal drying of the cell) in the further process and being too firm (e.g., process temperature during activation of the binder).
  No release of harmful gases (e.g., gases containing fluorine) upon thermal stress.
  High shelf life (e.g., storage temperature and storage period).
  Positive characteristics upon operation of the battery cell.
  No degradation of the binder by the electrolyte. Chemical compatibility with all cell components.
  Enabling the formation of a thinner surface layer on the electrodes especially on the negative electrode.
  Mechanical stabilization of the electrode over a long period of time or during many charge and discharge cycles. This mainly serves the purpose to compensate for the volume changes during intercalation and de-intercalation.
  Good wettability of the surface of the electrode with electrolyte.
  Thermal stability within the operating temperature of the cell.

As the cell according to the invention preferably has three dimensional current collectors and a $SO_2$ containing electrolyte, the selection of a binder meeting all of the above mentioned requirements is particularly difficult.

EXAMPLE 1

In the state of the art, as for instance described in WO 2011/098233 A2, the filling of the metal structure of the positive electrode was achieved by means of an organic solvent containing a soluble fluorine containing binder. The obtained capacities were typically around 15 mAh/cm² of electrode surface area.

During the invention, it was tried to simplify the production of the positive electrodes through the substitution of the organic solvent by water. Therefore the fluorine containing binder was dispersed in water. It was found, that the achievable loadings were reduced by around 7% to approx. 14 mAh/cm².

Surprisingly, the filling of the metal structure could in fact be optimized with one of the binders A or B according to the invention or a mixture of A and B and water as solvent, so that a similarly high level of filling of active material can be reached as previously only possible with the of use organic solvents.

As an example, for a preferred embodiment of the battery cell according to the invention positive electrodes were produced from the following components:
  94 wt % lithium iron phosphate (active material of the positive electrode)
  2 wt % carbon black (conductivity enhancer)
  4 wt % binder A With stirring, these components were used to produce a paste using water. The finished paste was introduced homogeneously into a metal foam with an initial porosity of more than 90% and dried at 50° C. for one hour. This step is necessary in order to obtain solvent free electrodes. Through calandering technology, after cooling the electrode was compressed from an initial thickness of approx. 1.00 mm to 0.56 mm, followed by another drying process at 120° C. in vacuum. The achieved capacities of these positive electrodes are typically again at 15 mAh/cm² of electrode surface area.

With a negative electrode a similar filling level was achieved through the optimization of the production parameters with water as solvent, as previously only achieved with the use of organic solvents.

As an example, for the production of a preferred embodiment of the battery cell according to the invention, the following components for the negative electrode were used:
  96 wt % graphite (active material of the negative electrode)
  4 wt % binder A Whilst stirring, a paste was produced from the components and water as solvent. The paste was introduced homogeneously into a metal-foam with an initial porosity of more than 90% and dried at 50° C. for one hour. This step is necessary to obtain solvent free electrodes. Through calandering technology, after cooling the electrode was compressed from an initial thickness of 1.00 mm to a thickness of 0.40-0.42 mm, followed by another drying process at 120° C. in vacuum.

The achieved capacities of the produced negative electrodes according to the invention are around 13 mAh/cm² electrode surface are.

EXAMPLE 2

The battery cell as described in WO 2011/098233 A2 contains a negative electrode, which is free of binder. This is due to the fact that many common binder materials, which can exclusively be used with organic and flammable solvents are not stable towards the used inorganic electrolyte.

The absence of a binder adds complexity to the production process of the negative electrode and leads to complex solutions.

Another reason for not using binder is that the addition of the therein described fluorine containing binder leads to a significant rise in the amount of lithium ions, which, during the first charge cycle, are irreversibly used by the formation of the surface layer on the negative electrode.

The impact of various binders on the irreversibly used capacity due to the formation of the surface layer on the negative electrode in the first cycle has been examined. To this end, various negative electrodes were produced with graphite as active material, the corresponding binder and a three dimensional current collector, as described in experiment 1. A binder-free reference electrode was produced the same way. The content of binder was adjusted to the different binder characteristics of the individual binder.

It should be noted that a high percentage of binder has a negative impact on the energy density respectively on the electrical energy per weight and volume unit of the battery cell.

In addition, a binder-free reference electrode was produced the same way. Five different sets of experimental electrodes have been manufactured this way. Table 1 describes the used binders:

TABLE 1 complete description of the binders used in example 2

Figure 3:
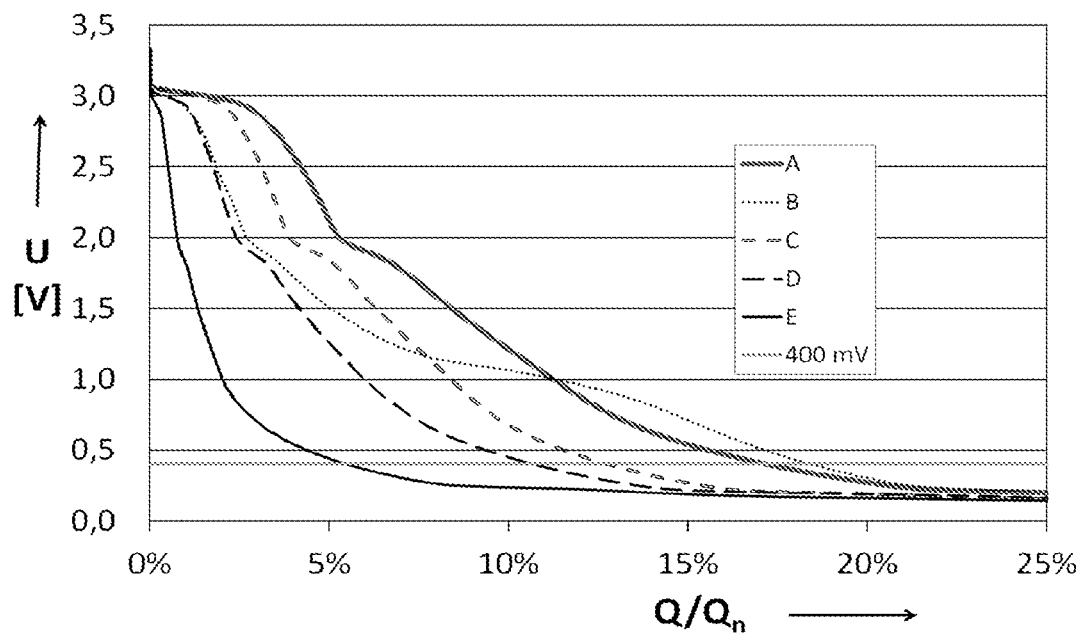
FIG. 3 the graph of the electric potential over the charge capacity for four negative electrodes with different binder materials.

| | electrodes | | | | |
|---|---|---|---|---|---|
| | electrodes with binder of state of the art | | binder free electrodes number in FIG. 3 | electrodes with binders according the invention | |
| | A | B | C | D | E |
| wt % of binder | 0.1 | 1 | 0 | 2 | 4 |
| solvent (production) | Aceton | Isopropanol | Isopropanol | Wasser | Wasser |
| polymer | THV Terpolymer of Tetrafluorethylene, Hexafluorpropylene und Vinylidene fluoride | PTFE Polytetra-fluorethylene | ,— | SBR Styrene-Butadiene | LiPAA Lithium-Polyacrylate |
| chemical structure | $(-CF_2-CF_2-CF_2-C_2F_4-CH_2-CF_2-)_n$ | $(-CF_2-CF_2-)_n$ | ,— | $[-CH_2-CH=CH-CH_2-]_m[-CHPh-CH_2-]_n$ | $[-CH_2-CH(COOX)-]_n$ |

The five experimental electrodes were examined via a three-electrode arrangement, where, during the charging of the electrode, the course of the electrical potential U expressed in volts was shown over the state of charge Q in relation to the rated capacity $Q_N$ of the electrode. The measurements were run in an electrolyte consisting of $LiAlCl_4 \times 1.5\ SO_2$.

The five graphs show the results of several experiments with the above described electrodes. In FIG. 3 the abscissa of the intercept between graph and 400 mV line corresponds to the used cell capacity due to formation of surface layer. It can be seen that the loss of capacity of the electrode with fluorine containing binders THV and PTFE is highest, followed by the reference electrode not containing a binder.

The curve of the electrode with the SBR binder according to the invention shows a significantly better relationship than the previous electrodes.

The lowest loss of capacity of just 6% has the electrode according to the invention with Li-PAA binder.

It is clearly visible that the electrode without binder also has a high loss of capacity during formation of the surface layer.

Table 2 summarizes the results:

TABLE 2

Used cell capacity due to formation of a surface
layer for electrodes with different binder.

| | electrodes | | | | |
|---|---|---|---|---|---|
| | electrodes with binder of state of the art | binder free electrodes | electrodes with binders according the invention | | |
| | | | number in FIG. 3 | | |
| | A | B | C | D | E |
| Polymer | THV | PTFE | — | SBR | LiPAA |
| Used cell capacity due to formation of a surface layer | 17% | 18% | 14% | 11% | 6% |

EXAMPLE 3

In order to reduce the very high capacity of surface layer of a binder-free electrode WO 2011/098233 A2 suggests elaborate measures such as, e.g., the temperature treatment of electrodes at 900° C. minimum for at least 10 h or the coating of the surface of the electrode. After the production of the electrode, both measures require time-consuming and costly production steps, such as described in example 1.

Electrodes produces according to example 1 can be used in a battery cell according to the invention without further treatment.

The test was performed analogous to example 2. In FIG. 4 as well the abscissa of the intercept between curve an 400 mV line corresponds to the used cell capacity due to formation of surface layer. The following electrodes were used:
A. Electrode with temperature treatment according to WO 2011/098233 A2;
B. Electrode with coating according to WO 2011/098233 A2; and
C. Electrode with 4% Li-PAA.

It is clearly visible that the two electrodes A and B have a substantially higher irreversible capacity loss than electrode C.

Table 3 summarizes the results:

TABLE 3

Irreversible capacity loss due to formation of a
surface layer for electrodes treated differently.

| | electrodes | | |
|---|---|---|---|
| | electrode with temperature treatment | electrode with coating | electrode with 4% Li-PAA |
| | number in FIG. 3 | | |
| | A | B | C |
| Irreversible capacity loss due to formation of a surface layer | 12% | 8% | 6% |

It is clearly visible that the irreversible capacity loss due to formation of a surface layer for electrodes, which are manufactured according to procedure described in WO 2011/098233 A2, has still high values.

Surprisingly, an electrode according to the invention shows outstanding behavior even without work-intensive post-treatment.

EXAMPLE 4

In example 4, the influence of the content of binder on the irreversible capacity loss due to formation of a surface layer was examined.

In order to compare electrodes according to the invention with the current state of the art, negative electrodes with different levels of THV binder were produced according to the procedure with acetone as solvent as described in example 1.

Here, the surface layer was determined through charging and discharging at 1 C rate two times. The cycle efficiency of the first two cycles was converted into the irreversible capacity loss due to formation of a surface layer (in % of the theoretical discharge capacity).

Table 4 shows the results:

TABLE 4

Irreversible capacity loss due to formation of a surface layer
for electrodes with different content of THV binder.

| wt % of THV-binder | 1 | 2 | 4 |
|---|---|---|---|
| used cell capacity (in %) of the theoretical capacity, due to formation of a surface layer | 24.1% | 26.4% | 33.5% |

It can clearly be seen that a higher level of binder has a negative impact on the characteristics of the electrodes. Whereas the irreversible capacity loss due to formation of a surface layer is still at 24.1% at a binder level of 1 wt % THV, it rises by approx. 10% points to 33.5% at a binder level of 4 wt %.

Figure 5:
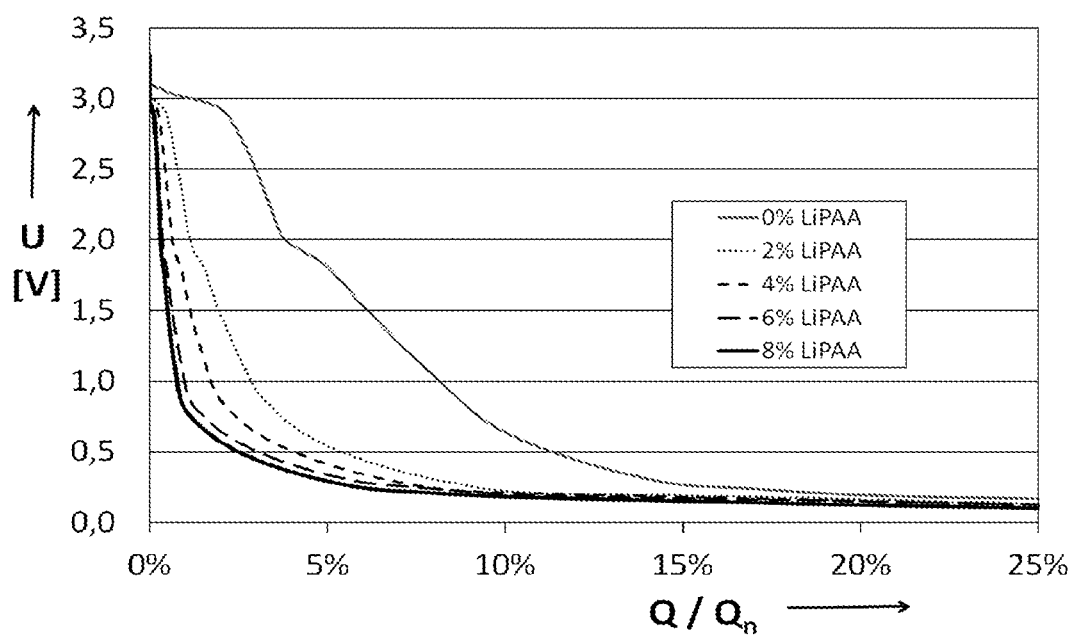
FIG. 5 the graph of the electric potential over the charge capacity for four negative electrodes with a different content of Li-PAA binder.

FIG. 5 shows negative electrodes according to the invention with different content of Li-PAA binder. The capacity of the surface layer can be seen in the graph.

Here, surprisingly, better results can be achieved with a higher level of binder. The performance of the electrodes with binder according to the invention is contrary to the performance of the electrodes with THV binder.

The best results are achieved with a level of Li-PAA of 8 wt %. But also the electrode with a content of Li-PAA of 2 wt % shows a significant improvement of the electrode.

However, the electrodes with a high level of Li-PAA show a lower energy density as the electrodes contain less active material. The increase of binder content within an electrode must not exceed the decrease of irreversible capacity loss due to the replacement of active material, otherwise there is no increase in the further cycleable capacity. Best results are achieved with a binder content of approx. 4 wt %.

EXAMPLE 5

For this experiment, two prismatic full cells with two negative and a positive electrode were produced. The electrodes were stacked together with a separator arranged in between and introduced in a prismatic housing.

Both full cells contained positive electrodes which were produced from the following components according to the procedure in Example 1, yet with acetone as solvent:
94 wt % lithium iron phosphate
2 wt % carbon black (conductivity enhancer)
4 wt % THV as binder
Positive electrodes with a capacity of 15 mAh/cm$^2$ were produced.

Full cell B contained binder-free negative electrodes, which were treated with a temperature treatment according to WO 2011/098233 A2.

For the production of complete cell A negative electrodes according to the invention were produced from the following components according to the procedure in Example 1:
  96 wt % graphite (active material of the negative electrode)
  4 wt % binder A Negative electrodes with a capacity of 14 mAH/cm$^2$ electrode surface were produced respectively.

The complete cells were filled with an electrolyte consisting of LiAlCl$_4$×6SO$_2$.

First, the cell was gradually conditioned at a charge and discharge rate of approx. 0.05 C (equals 10 mA). In doing so, the surface layer is formed and the irreversible capacity loss due to the formation of the surface layer can be determined.

During the following 100 cycles the cells were cycled at a charge and discharge rate of approx. 0.5 C (equals 100 mA). After 100 cycles the charge rate and discharge rate is increased to approx. 1 C (equals 200 mA).

The charge was carried out in an IU process. The cell is being charged with a constant current up to a voltage level of 3.6 V. At a cell voltage of 3.6 V the current is reduced. When the current first falls below a minimum current of 40 mA the charge process is stopped.

The discharge was carried out with a constant current and stopped at a cell voltage of 2.5 V.

Figure 6:
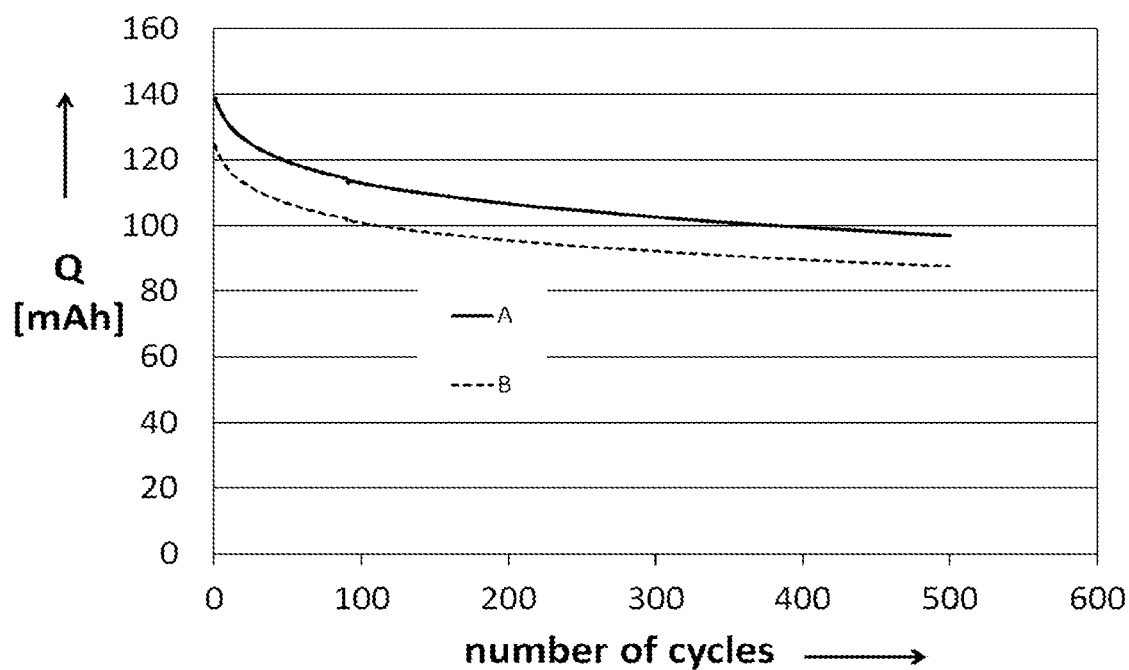
FIG. 6 the comparison of the absolute level of dischargeable capacity of cells with thermal pretreatment of the negative electrode and a negative electrode, which has been produced with a binder according to the invention.

FIG. 6 shows the discharge capacity over the number of cycles. The two graphs shown indicate average values of various experiments with the electrodes described above.

It is surprising that despite the addition of 4% binder a higher absolute discharge capacity can be reached.

The cycle life of a cell is determined by the retaining a certain discharge capacity, e.g., 70% of the nominal capacity. Due to the higher initial capacity the cycle life of cell A is substantially higher than the one of cell B. Cell A reaches the final discharge capacity later than cell B.

EXAMPLE 6

For this example, a similar procedure to the one used in example 5 is to be followed except that three prismatic full cells are produced. The negative electrode of the third cell has 4 wt % SBR binder.

Figure 7:
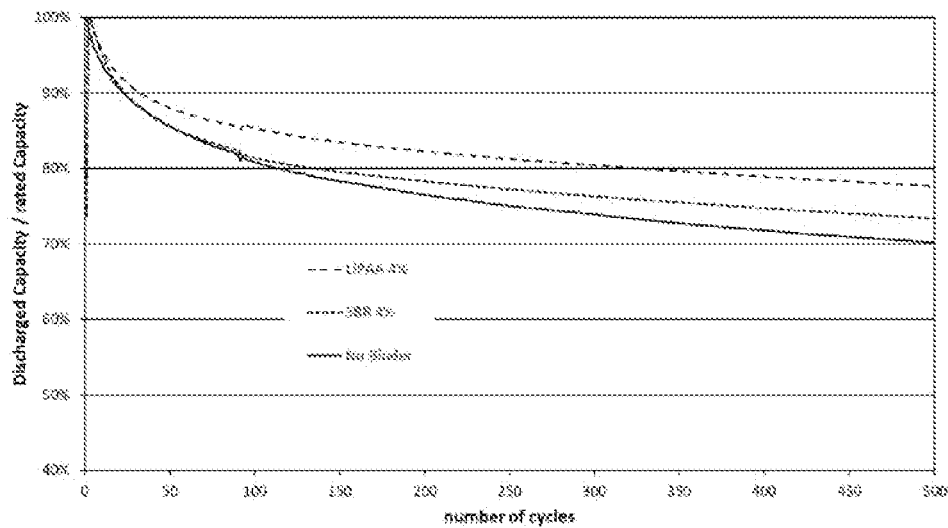
FIG. 7 the comparison of the absolute level of dischargeable capacity of three cells: (1) with thermal pretreatment of the negative electrode; (2) a negative electrode with a 4% LiPAA binder; and (3) a negative electrode with a 4% SBR binder.

FIG. 7, similar to FIG. 6, shows the discharge capacity over the number of cycles, but with the addition of the cell with a 4% SBR binder. The SBR binder in an amount of 4% shows good results. The available capacity is increased and the capacity decrease is reduced in comparison to the cell with the reference electrode without binder.

Surface layers are generated by the reaction of the active metal (e.g., Lithium) with compounds of the electrolyte solution in the first charge cycle of a battery. This reaction takes place on the surface of the active material and the reaction products build a surface layer on the active material. This surface layer protects the active material against further reaction. The amount of lithium bound in the layer is no longer able to contribute ions to the charge/discharge-process of the battery. The capacity of the battery is reduced.

Figure 8:
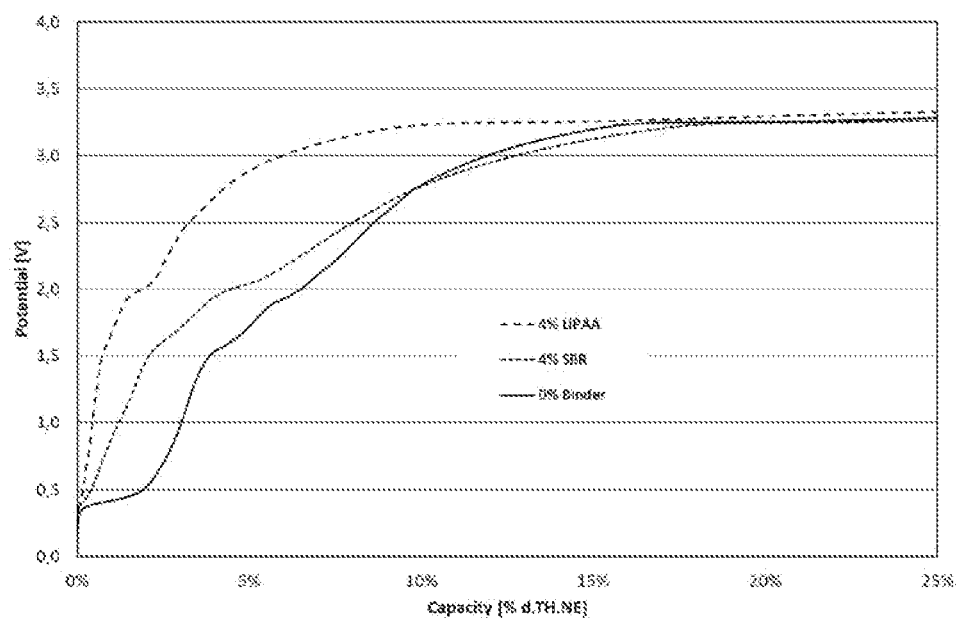
FIG. 8 the graph of the electric potential versus charge capacity for three cells: (1) with thermal pretreatment of the negative electrode; (2) a negative electrode with a 4% LiPAA binder; and (3) a negative electrode with a 4% SBR binder.

FIG. 8 shows the potential over the capacity for the first cycle of the cells with the (1) SBR binder, the (2) LiPAA binder and (3) for the reference without binder in prismatic full cells. The measurement starts at a potential of 3.2 Volts.

The electrodes with LiPAA binder and SBR binder show the surface layer formation in the range of 15%-5% of the capacity. In this range, stable surface layers are built. The reference electrode also shows a surface layer formation in the range of 15%-5%, but another surface layer formation can be observed in the range of 5%-0% of the capacity. In this range, unstable surface layers are built. These unstable layers cannot protect the active material.

The irreversible loss due to the formation of the surface layer for the LiPAA binder is around 8% of the theoretical capacity of the negative electrode and for the SBR binder and the reference without binder around 15%. (Table 2 shows similar results.)

Though the surface layer capacity of the SBR binder and the reference without binder are nearly the same, the SBR binder supports the building of stable surface layers, while the reference without binder forms unstable layers.

In addition, the SBR binder is water-soluble and allows, therefore, easier and safer production of electrodes.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A rechargeable electrochemical battery cell, comprising:
  a housing;
  a positive electrode;
  a negative electrode; and
  an electrolyte containing SO$_2$ and a conductive salt of the active metal of the cell, wherein the electrolyte contains at least 1.5 mol SO$_2$ per mol conducting salt;
  wherein the electrolyte is based on SO$_2$ and the mobility of the ions of the conducting salt is at least partially guaranteed by SO$_2$;
  wherein at least one of the electrodes contains a binder comprising a polymer based on monomeric styrene or butadiene structural units; and
  wherein the binder is present in an amount effective to reduce capacity loss and no more than 8 wt %.

2. The battery cell according to claim 1, wherein the binder is present in an amount effective to reduce capacity loss and no more than 10 wt %.

3. The battery cell according to claim 1, wherein the electrolyte contains at least 2.5 mol SO$_2$ per mol conducting salt.

4. The battery cell according to claim 1, wherein the negative electrode contains the binder.

5. The battery cell according to claim 1, wherein at least one of the electrodes contains an additional binder different from the binder comprising a polymer based on monomeric styrene or butadiene structural units.

6. The battery cell according to claim 5, wherein the additional binder comprises a polymer built up from monomeric structural units of an alkali salt of acrylic acid.

7. The battery cell according to claim 1, wherein at least one of the electrodes has a current collector element with a three-dimensional porous metal structure.

8. The battery cell according to claim 7, wherein the porous metal structure extends essentially over the entire thickness of the electrode.

9. The battery cell according to claim 7, wherein the active metal is distributed essentially homogeneously in the porous metal structure.

10. The battery cell according to claim 1, wherein the positive electrode has a thickness of at least 0.25 mm.

11. The battery cell according to claim 1, wherein the positive electrode has a thickness of at least 0.25 mm and a maximum thickness of 2.0 mm.

12. The battery cell according to claim 1, wherein the negative electrode has a thickness of at least 0.2 mm.

13. The battery cell according to claim 1, wherein the negative electrode has a thickness of at least 0.2 mm and a maximum thickness of 1.5 mm.

14. The battery cell according to claim 1, wherein the active metal is selected from the group consisting of alkali metals, alkaline earth metals, metals in the subgroup 12 of the periodic system and aluminum.

15. The battery cell according to claim 14, wherein the active metal is lithium, sodium, calcium, zinc, or aluminum.

16. The battery cell according to claim 1, wherein the negative electrode is an insertion electrode.

17. The battery cell according to claim 16, wherein the negative electrode contains carbon.

18. The battery cell according to claim 1, wherein the positive electrode contains a metal oxide or a metal halide or a metal phosphate.

19. The battery cell according to claim 18, wherein the positive electrode contains an intercalation compound.

20. The battery cell according to claim 1, wherein the electrolyte contains a halide, an oxalate, a borate, a phosphate, an arsenate, or a gallate of the active metal, as the conductive salt.

\* \* \* \* \*